United States Patent
Klem, Jr.

(10) Patent No.: US 8,869,480 B2
(45) Date of Patent: *Oct. 28, 2014

(54) METHOD AND APPARATUS FOR PREVENTING BIRDS FROM COLLIDING WITH OR STRIKING FLAT CLEAR AND TINTED GLASS AND PLASTIC SURFACES

(76) Inventor: Daniel Klem, Jr., Allentown, PA (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/348,199

(22) Filed: Jan. 11, 2012

(65) Prior Publication Data

US 2012/0113519 A1    May 10, 2012

Related U.S. Application Data

(63) Continuation-in-part of application No. 12/258,558, filed on Oct. 27, 2008, now Pat. No. 8,114,503, which is a continuation-in-part of application No. 11/162,008, filed on Aug. 25, 2005, now abandoned.

(51) Int. Cl.
*E04C 1/42* (2006.01)
*A01M 29/06* (2011.01)

(52) U.S. Cl.
CPC .................................... *A01M 29/06* (2013.01)
USPC .......................... 52/311.1; 52/307; 52/309.1

(58) Field of Classification Search
USPC ......... 52/306, 307, 308, 311.1; 428/409, 410, 428/426, 195.1; 362/153.1
See application file for complete search history.

(56) References Cited

U.S. PATENT DOCUMENTS

| | | | |
|---|---|---|---|
| 5,843,546 A * | 12/1998 | Eichhorn | 428/38 |
| 6,092,909 A * | 7/2000 | Sools et al. | 362/153.1 |
| 6,607,809 B2 * | 8/2003 | Baker-Salmon | 428/162 |
| 7,992,361 B2 * | 8/2011 | Thiagarajan et al. | 52/783.1 |
| 8,091,303 B2 * | 1/2012 | Losonczi | 52/307 |
| 2007/0074484 A1 * | 4/2007 | Yin | 52/750 |

FOREIGN PATENT DOCUMENTS

EP    1479294 A2 * 11/2004 ............ A01M 29/00

* cited by examiner

*Primary Examiner* — Charles A. Fox
*Assistant Examiner* — Patrick Maestri
(74) *Attorney, Agent, or Firm* — Design IP

(57) ABSTRACT

Clear or tinted window panes of glass or plastic having a pattern of dots, vertical lines, horizontal lines or a combination of vertical and horizontal lines in a regular pattern on a surface of the pane, the pattern being visible to the avian eye to prevent birds from striking or colliding with the window pane and having optical characteristics of a minimum of 20% ultraviolet reflection separated by ultraviolet absorption.

20 Claims, 8 Drawing Sheets

ME THOD AND APPARATUS FOR
PREVENTING BIRDS FROM COLLIDING
WITH OR STRIKING FLAT CLEAR AND
TINTED GLASS AND PLASTIC SURFACES

CROSS REFERENCE TO RELATED
APPLICATION(S)

This application is a continuation-in-part of U.S. patent application Ser. No. 12/258,558, filed Oct. 27, 2008, which is a continuation-in-part of U.S. patent application Ser. No. 11/162,008, filed Aug. 25, 2005, which are incorporated by reference as if fully set forth.

BACKGROUND OF THE INVENTION

The present invention pertains to the prevention of bird strikes against transparent and translucent building materials such as glass and plastic sheet materials. The invention can be used or incorporated as part of glass manufacturing; plastic manufacturing; glass coatings; plastic coatings; glass etching; plastic etching; ceramic frit; architecture; building development; landscaping; animal control, protection and welfare; conservation biology; ornithology.

SUMMARY OF THE INVENTION

This invention describes a means by which clear and reflective sheet (flat pane) glass and plastic will be rendered visible to birds. Birds behave as if clear and reflective sheet (flat pane) glass and plastic are invisible to them, and they fly into (strike) the glass or plastic resulting in their death or injury. Billions of birds are killed worldwide at sheet (flat pane) glass and plastic of all sizes and in all types of human structures. These are unintended deaths that can be avoided if sheet (flat pane) glass and plastic are modified in a way that birds will recognize and avoid it as a barrier. Creating patterns on sheet (flat pane) glass and plastic composed of individual elements ultraviolet reflective in the range of 300 to less than 400 nanometers wavelength that are separated by 2.5 centimeters (1 inch) or less with spaces between said ultraviolet reflecting portion of the pattern being ultraviolet absorbing in the range of 300 to less than 400 nanometers wavelength is known to transform the space occupied by sheet (flat pane) glass and plastic into a barrier that birds will see and avoid. The individual elements are ultraviolet reflecting in the range of 300 to less than 400 nanometers in wavelength and ultraviolet absorbing in the range of 300 to less than 400 nanometers in wavelength. This invention will save the lives of billions of birds worldwide, and among them the rare, threatened and endangered species that fall under the protection of the national laws of sovereign nations and international treaties.

The present invention in its broadest form comprises placing on the surface of a window pane fabricated from a clear or tinted glass or plastic a uniform pattern of elements, the elements having optical characteristics of ultraviolet reflection in a range of from 300 to less than 400 nanometers in wavelength separated by ultraviolet absorption in the in a range of from 300 to less than 400 nanometers in wavelength and wherein there is a minimum of 20% ultraviolet reflectance in the elements having ultra violet reflectance.

DETAILED DESCRIPTION OF THE INVENTION

Figure 1:
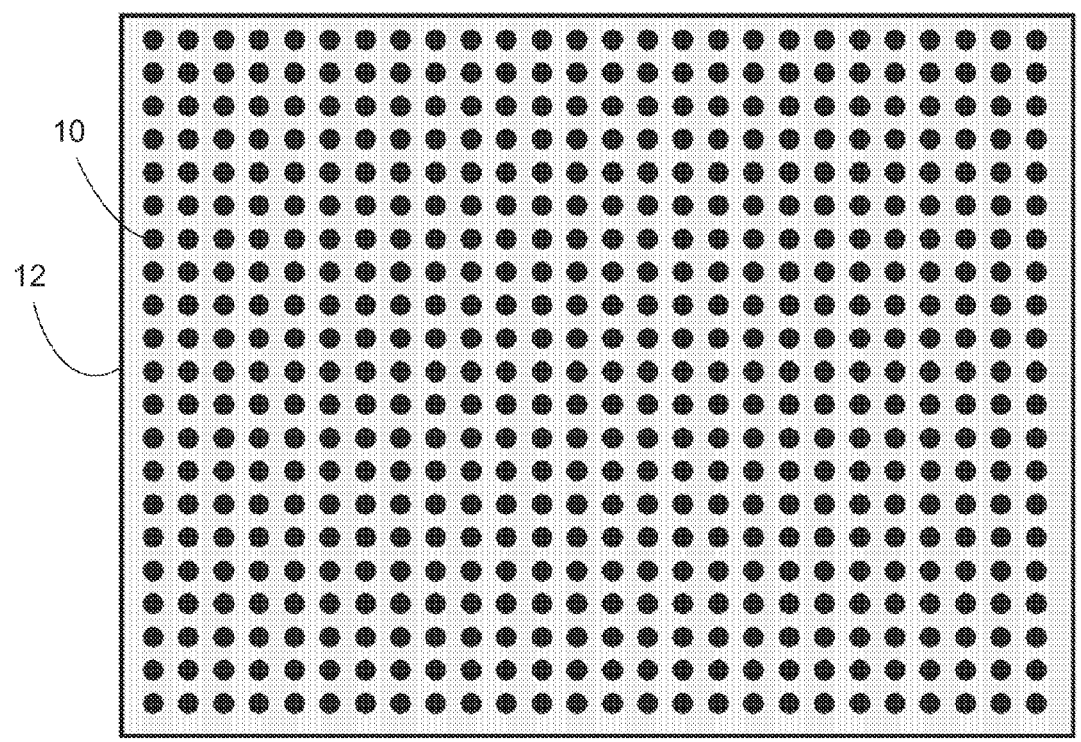
FIG. 1 is a schematic representation of a pattern of dots used in accord with the present invention.

Clear and reflective flat pane (sheet) glass and plastic as windowpanes in all manner of human structures are passive killers of birds worldwide. Birds behave as if clear and reflective glass and plastic are invisible to them, and they kill or injure themselves colliding with windows. Billions of birds are killed worldwide after colliding with glass and plastic. This unintended avian mortality factor can be eliminated using the bird-friendly sheet (flat pane) glass and plastic described herein. Extensive observations and experiments reveal that all birds are potentially vulnerable to the glass and plastic hazard and fatal collisions are possible wherever birds and glass and plastic mutually occur. Bird kills at glass and plastic are substantial, foreseeable, and avoidable, and at least within the United States it is reasonable to expect that birds merit protection from glass and plastic collisions under the purview of the Migratory Bird Treaty Act of 1918 and the Endangered Species Act of 1973, and may merit equal or similar protection from glass and plastic under the purview of laws of other sovereign nations and international treaties.

Through various means currently available to glass and plastic manufacturers and their allied product industries, a visible or invisible uniform pattern to the normal human eye can be created in flat pane (sheet) glass and plastic. If visible to the normal human eye the pattern is composed of elements that appear opaque or translucent and contrast with adjacent clear or reflective glass or plastic areas. The elements forming the pattern: (1) uniformly cover an entire pane (sheet), (2) are of any shape and size, and (3) are separated by 10 centimeters (4 inches) or less. Birds act as if the elements forming the pattern are visible to them when viewed from the exterior surface of clear and tinted sheet (flat pane) glass and plastic. This patterned glass and plastic are intended and for use in all human structures: commercial, residential, and any other designated functions containing sheet (flat pane) glass or plastic that face the outside environment. The patterns create a visual warning about the hazard of glass and plastic to birds in the environment. Wild birds avoid flying into (striking) these uniquely patterned-type glasses and plastics by behaving as if they recognize the space the glass occupies as a barrier to be avoided. For all means by which these patterns are created on any surface of single or a multiple-pane unit, the patterns are visible to birds and may or may not be visible to the normal human eye when looking at the exterior surface of the glass or plastic from the environment outside a human structure. Depending on the means by which the patterns are created, the patterns may or may not be visible to the normal human eye looking at (through) the glass or plastic from inside a human structure.

The sheet (flat pane) glass and plastic on which bird protection patterns are created is either inorganic glass prepared using float glass technology or any other means, and plastic sheets (flat pane) using any means of plastic technology. Inorganic glass sheets, plastic sheets, or a combination in laminated form producing the same visual effects will create effective bird protection from collisions.

Elements creating a protective pattern will be invisible to the normal human eye but will be visible to the avian eye if created using alternating ultraviolet (UV) reflective in the 300 nanometers to less than 400 nanometers wavelength range and ultraviolet absorption in the 300 to less than 400 nanometers wavelength range.

Technologies currently exist to create sheet (flat pane) glass and plastic with either of these visual effects for humans and birds. The following are known means to create protective patterns in sheet (flat pane) glass and plastic. Other means may also exist, and if so, they can be used to create the described avian protective patterns.

Coatings on any surface of a solid or laminated pane or panes that create a pattern by reflecting and absorbing ultraviolet (UV) wavelengths in the avian visual range and that are visible to birds in the glass or plastic when viewed from outside a human structure. These created patterns may or may not be visible to the normal human eye when viewing the glass or plastic from outside (exterior) a human structure, and these created patterns may not be visible to the normal human eye when viewing the glass or plastic from inside a human structure. Coatings are molecularly bonded or adhere by other means and are an integral part of the glass and plastic surface.

Translucent (frosted) elements can be used to create a pattern. Translucent (frosted) elements can be applied on any surface of a solid or laminated pane or panes if the glass or plastic are clear (transparent) and placed at see-through sites such as corridors or where corners meet in human structures; patterns at such sites are visible to normal human and avian eyes when viewing the glass or plastic from outside or inside a human structure. Translucent (frosted) elements used to create the pattern typically will be on the outside surface of tinted glass or plastic, or on any other surface such that the pattern is visible to normal human and avian eyes when viewing the glass from outside a human structure. Translucent (frosted) elements can be applied to glass or plastic surfaces by acid etching, etching by other means, sand blasting, ceramic frit technique involving temperatures in excess of 648.9 degrees Centigrade (1200 degrees Fahrenheit), or any other means.

A pattern visible to normal human and avian eyes when viewing glass or plastic from outside but not inside a human structure (type of one-way glass or plastic) can be created using coatings as a permanent integral part of the glass or plastic surface, external non-permanent films, and nanoparticle technology where nanoparticles creating the pattern are an integral part of the sheet (flat pane) glass or plastic. Non-permanent films crafted with the described bird-protecting patterns are available for use such as those manufactured by the 3M Company and used in advertising to create a visible pattern when viewing the glass surface from outside a structure (like buses); the pattern is not visible when viewing from inside a structure.

A novel pane showing an avian protection pattern that is visible to the normal human and avian eyes when viewing the glass from outside a human structure but not visible when viewing (looking out) from inside a human structure can be created using nanoparticles that are placed within the glass or plastic. The particles reflect visible light wavelengths that create an avian protection pattern when viewed from outside but not when viewed from the inside of a human structure.

Experiments testing the following specific designs have confirmed that birds can effectively detect and avoid patterns covering the entire glass or plastic surface created with ultraviolet reflective elements, the element being ultraviolet reflecting in the range of 300 to less than 400 nanometers wavelength: (1) 2.5 centimeters (1 inch) stripes placed 10 centimeters (4 inches) apart forming parallel vertical columns, (2) 2.5 centimeters (1 inch) stripes placed 5 centimeters (2 inches) apart forming parallel vertical columns, (3) 2.5 centimeters (1 inch) stripes placed 5 centimeters (2 inches) apart forming parallel horizontal rows, (4) 2.5 centimeters (1 inch) stripes placed 8 centimeters (3 inches) by 10 centimeters (4 inches) apart in parallel horizontal rows and vertical columns forming a mesh (checkerboard or lattice) pattern where the 8 centimeter (3 inches) distance is between horizontal rows and the 10 centimeters (4 inches) distance is between vertical columns, and (5) 2.5 centimeters (1 inch) stripes placed 5 centimeters (2 inches) apart in parallel vertical columns and horizontal rows forming a mesh (checkerboard or lattice) pattern with the spaces between the ultraviolet reflecting elements being ultraviolet absorbing in the range of 300 to less than 400 nanometers wavelength. The size (thickness of stripes, diameter of circles, dimensions of other shapes) of the elements making up the pattern must be at least 0.317 centimeter (0.125 inch) and may be increased. The spacing between elements making up the pattern may be increased from a minimum of 0.317 centimeter (0.125 inch) but must be no greater than 10 centimeters (4 inches) between a vertical column or 5 centimeters (2 inches) between a horizontal row to effect similar protection for birds. In any pattern the most effective detection by birds is achieved when the stripes or dots are ultraviolet reflecting in the 300 to less than 400 nanometers wavelength range and the spaces between the elements are ultraviolet absorbing in the 300 to less than 400 nanometers wavelength range. These same patterns will provide similar protection for birds and be invisible to the normal human eye if created with UV reflection and absorption.

A clear or tinted window pane can be constructed with a uniform pattern covering the outer surface of the pane, where the pattern is composed of elements that appear visible to the normal human eye when viewed from both the outside and inside environment of a structure; the size of the elements making up the pattern being 0.317 centimeter (0.125 inch) or greater with the spacing between elements being 0.317 centimeter (0.125 inch) to 10 centimeters (4 inches) if pattern elements are arranged in vertical columns or 5 centimeters (2 inches) if pattern elements are arranged in horizontal rows and obscure the ultraviolet reflecting elements and intervening ultraviolet absorbing spaces as discussed above.

The elements of the pattern will be invisible to the normal human eye created by substances placed on an outer surface of the single pane outer pane of a multiple pane unit that reflect ultraviolet wavelengths between 300 nanometers to less than 400 nanometers and absorb ultraviolet wavelengths between 300 and less than 400 nanometers between the ultraviolet reflecting portion of the pane.

Referring to FIG. 1, there is shown a regular pattern of dots 10 embodying the present invention. Each of the dots 10 is placed on the outer surface of a window pane 12 in a regular pattern as shown. Each of the dots has a minimum diameter of 0.317 centimeter (0.125 inch) and the dots 10 are placed in a spaced apart relation to each other between 0.317 centimeter (0.125 inch) and 10 centimeters (4 inches) vertically and horizontally.

Figure 2:
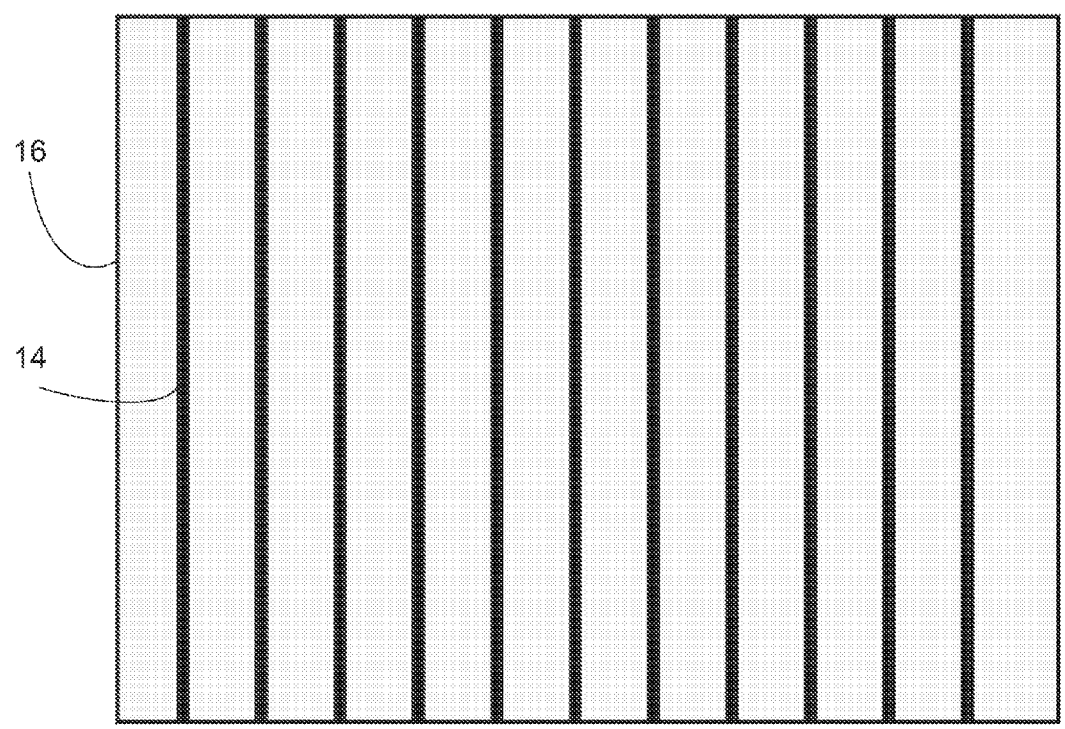
FIG. 2 is a schematic representation of a vertical line pattern used in accord with the present invention.

Referring to FIG. 2, there is shown a pane 14 having vertical stripes 16 which are between 0.317 centimeter (0.125 inch) and 2.5 centimeters (1 inch) in thickness and having a vertical spacing of 0.317 centimeter (0.125 inch) to 10 centimeters (4 inches).

Figure 3:
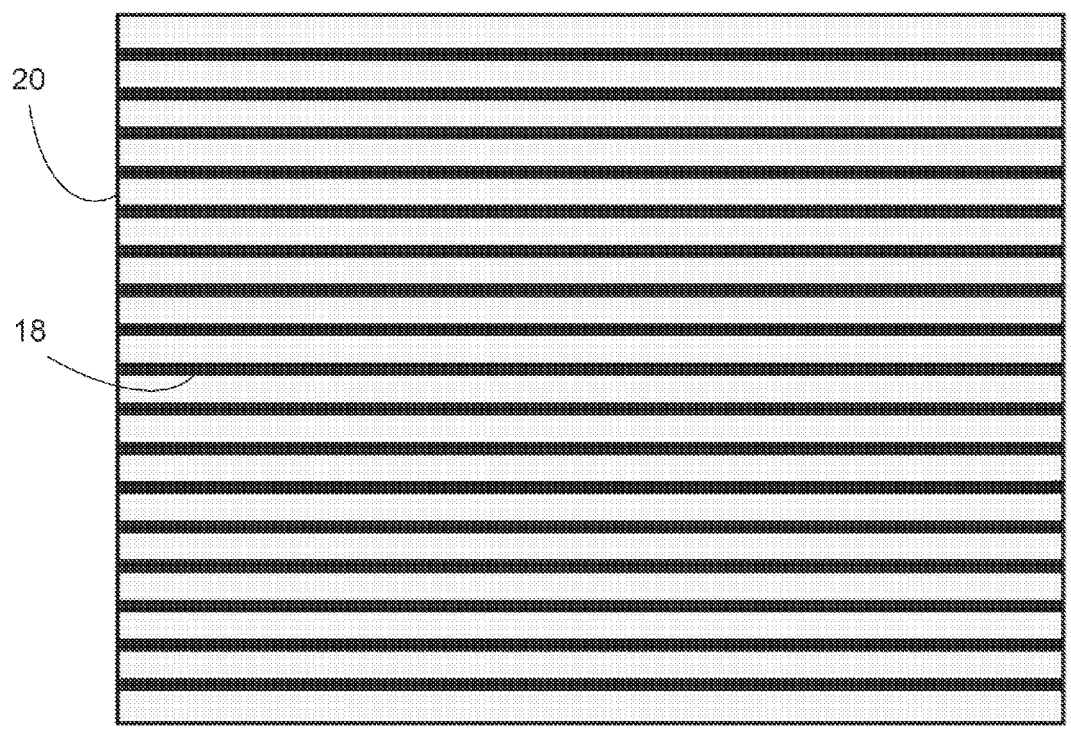
FIG. 3 is a schematic representation of a horizontal line pattern used in accord with the present invention.

Referring to FIG. 3, there is shown a window pane 18 having a regular pattern of horizontal elements or stripes 20 each of which has a thickness between 0.317 centimeter (0.125 inch) and 2.5 centimeters (1 inch) with the horizontal elements 20 spaced apart between 0.317 centimeter (0.125 inch) and 5 centimeters (2 inches).

Figure 4:
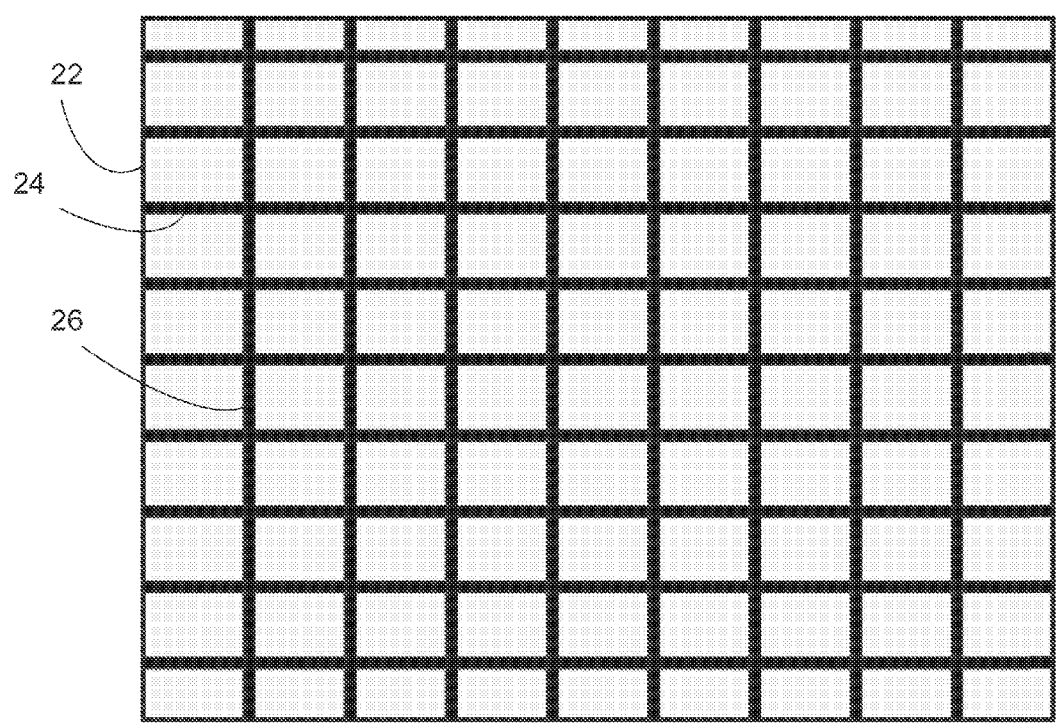
FIG. 4 is a schematic representation of a grid pattern used in accord with the present invention.

Referring to FIG. 4, there is shown a window pane 22 having a lattice or grid pattern of horizontal lines 24 and vertical lines 26 each of the lines having a thickness of between 0.317 centimeter (0.125 inch) and 2.5 centimeters (1 inch). The spacing of the vertical elements in the grid of FIG. 4 is between 0.317 centimeter (0.125 inch) and 10 centimeters (4 inches) and the spacing of the horizontal elements 24 of the grid are between 0.317 centimeter (0.125 inch) and 8 centimeters (3.125 inches).

An experiment was conducted over 90 days from 29 Oct. 2007 to 9 Feb. 2008, and tested a new clear UV-reflecting film, alone and in combination with an existing exterior clear UV-absorbing film from CPFilms, Inc. The clear film reflected affectively 20% to 40% UV radiation. The experimental windows were: (1) clear glass control, (2) complete covering of clear UV-reflecting film applied to exterior surface (CUV-O); (3) same as 2 but applied to interior glass surface (CUV-I); (4) 2.5 cm wide UV-reflecting film stripes oriented vertically and separated by 5 cm UV-absorbing film stripes oriented vertically and applied to the outside glass surface (S-1R); (5) 5 cm wide UV-reflecting film stripes oriented vertically and separated by 2.5 cm UV-absorbing film stripes oriented vertically and applied to the outside glass surface (S-2R-O); (6) same as 5 but applied to the interior glass surface (S-2R-I), and (7) a grid pattern consisting of 10 cm wide UV-reflecting vertical columns separated by 2.5 cm wide UV-absorbing vertical columns, and 8 cm wide UV-reflecting horizontal rows separated by 2.5 cm wide UV-absorbing horizontal rows applied to the outside glass surface (GRID).

A total of 86 strikes were recorded in their experiment; 13 (15%) were fatal. The total number of strikes differed significantly across all treatments, with 60 (70%) at the clear glass control, 8 (9%) at CUV-O, 7 (8%) at CUV-I, 2 (2%) at S-1R, 1 (1%) at S-2R-O, 4 (5%) at S-2R-I, and 4 (5%) at the GRID ($\chi^2$=219.23, df=6, P<0.001). All 13 fatalities occurred at the clear glass control and were: 1 Black-capped Chickadee, 1 White-breasted Nuthatch, 2 House Finches, 1 American Goldfinch, 1 American Tree Sparrow, and 7 Dark-eyed Juncos.

In addition to the patterning of the glass surface as described above it was discovered that the ultraviolet reflecting elements must show a minimum ultraviolet (UV) reflectance of 20%.

Figure 7:
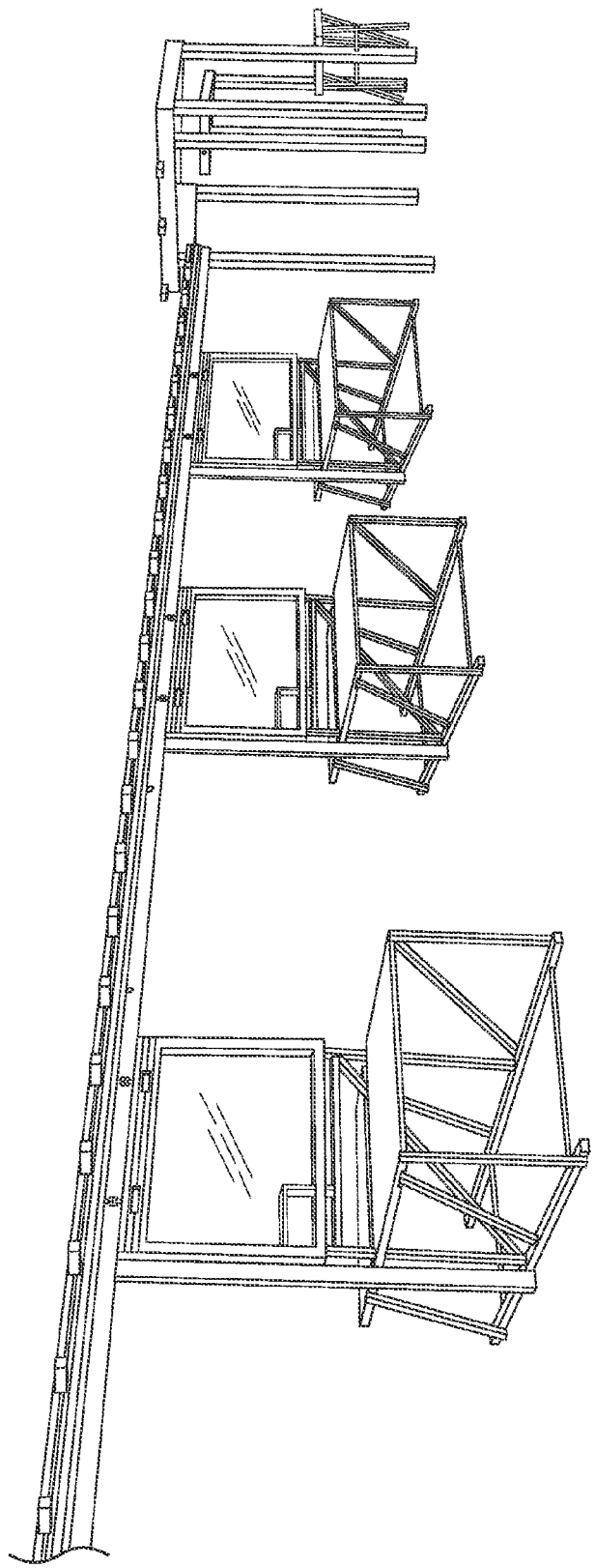
FIG. 7 is a photograph of the experimental apparatus used to test the present invention.

An experiment was conducted on a 2-ha open rural area of mowed pasture bordered by second growth deciduous forest and shrubs in Henningsville, Berks County, Pa., USA (40° 27' 53" N, 075° 40' 07" W). The experimental apparatus shown pictorially in FIG. 7 consists of a new wood-framed structure constructed to replicate the installation of sheet glass windows on the first level (ground) of commercial and residential buildings and those installed as noise and protective barriers. All windows were placed in the same habitat oriented in the same direction 1 m (3.3 ft) from a tree-shrub edge facing an open field. Each window measured 1.2 m (4.0 ft) wide by 0.9 m (3.0 ft) high and was mounted 1.2 m (4.0 ft) above ground. Plastic mesh trays were placed under each window to catch casualties. Three window units were used in the experiment, and were separated by 2.4 m (8.0 ft). A single platform feeder measuring 61.0 cm (24.0 in) on a side and 1.2 m (4.0 ft) above ground mounted on crossed wooden-legs centered and placed 10 m (33.0 ft) in front of each window to simulate a feeding station at a rural commercial or residential building. Feed consisted of 1:1 mixture of black-oil sunflower seeds and white proso millet. All feeders were kept full throughout the experiment. No window type was positioned at the same location on consecutive days, and each window tested was randomly assigned and moved to a new location daily. Windows were minimally checked and changed daily 30 min before last light, and for most days windows were also checked in the morning and at varying times throughout the day. Windows were covered with opaque tarps and not monitored during inclement weather such as high winds, rain, or snow.

The parameter (criterion) measured was the number of detectable bird strikes. A strike was recorded when either dead or injured birds were found beneath a window, or when fluid or a blood smear, feather, or body smudge was found on the glass. The data are likely incomplete and conservative because a previous study where continuous monitoring occurred found that without continuous monitoring 25% of strikes went undetected, leaving no evidence of a collision. Predators and scavengers also are known to remove the dead and injured collision victims, making specimens unavailable for detection and collection. The length of the experiment was determined by the number of recorded strikes required to statistically evaluate the differences between treatments. The experimental period occurred during non-breeding and migratory periods (some species), but previous studies indicate no seasonal differences in the ability of birds to avoid windows.

The experiment was conducted over 75 days from 3 Oct. to 18 Dec. 2010.

Figure 5:
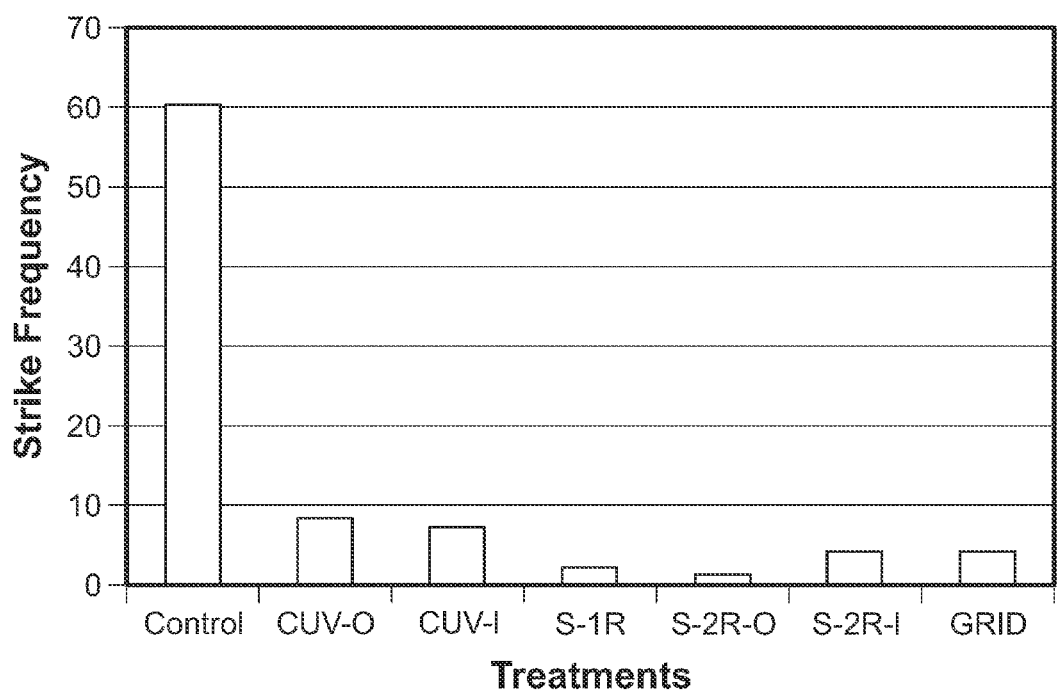
FIG. 5 is a bar graph of bird strike frequency for a control sample and glass patterned according to the invention.

As shown in FIG. 5, the results obtained using the experimental set up described above shows strike rates were significantly different between the clear glass (Control) window and the six film covered windows ($\chi^2$=219.23, df=6, P<0.001): (1) CUV-O=Complete Covering of UV-reflecting (20% or >) Film applied to outside glass surface, (2) CUV-I=Complete Covering of UV-reflecting (20% or >) Film applied to inside glass surface, (3) S-1R=2.5 cm (1 in) UV-reflecting (20% or >) stripes oriented vertically and separated by 5 cm (2 in) UV-absorbing (91%) stripes oriented vertically and applied to outside glass surface, (4) S-2R-O=5.0 cm (2 in) UV-reflecting (20% or >) stripes oriented vertically and separated by 2.5 cm (1 in) UV-absorbing (91%) stripes oriented vertically and applied to outside glass surface, (5) S-2R-I=5.0 cm (2 in) UV-reflecting (20% or >) stripes oriented vertically and separated by 2.5 cm (1 in) UV-absorbing (91%) stripes oriented vertically and applied to inside glass surface, and (6) GRID=A mesh, grid or checkerboard pattern consisting of 10 cm (4 in) UV-reflecting (20% or >) vertical columns separated by 2.5 cm (1 in) UV-absorbing (91%) vertical columns, and 8 cm (3 in) UV-reflecting (20% or >) horizontal rows separated by 2.5 cm (1 in) UV-absorbing (91%) horizontal rows applied to the outside glass surface.

Figure 6:
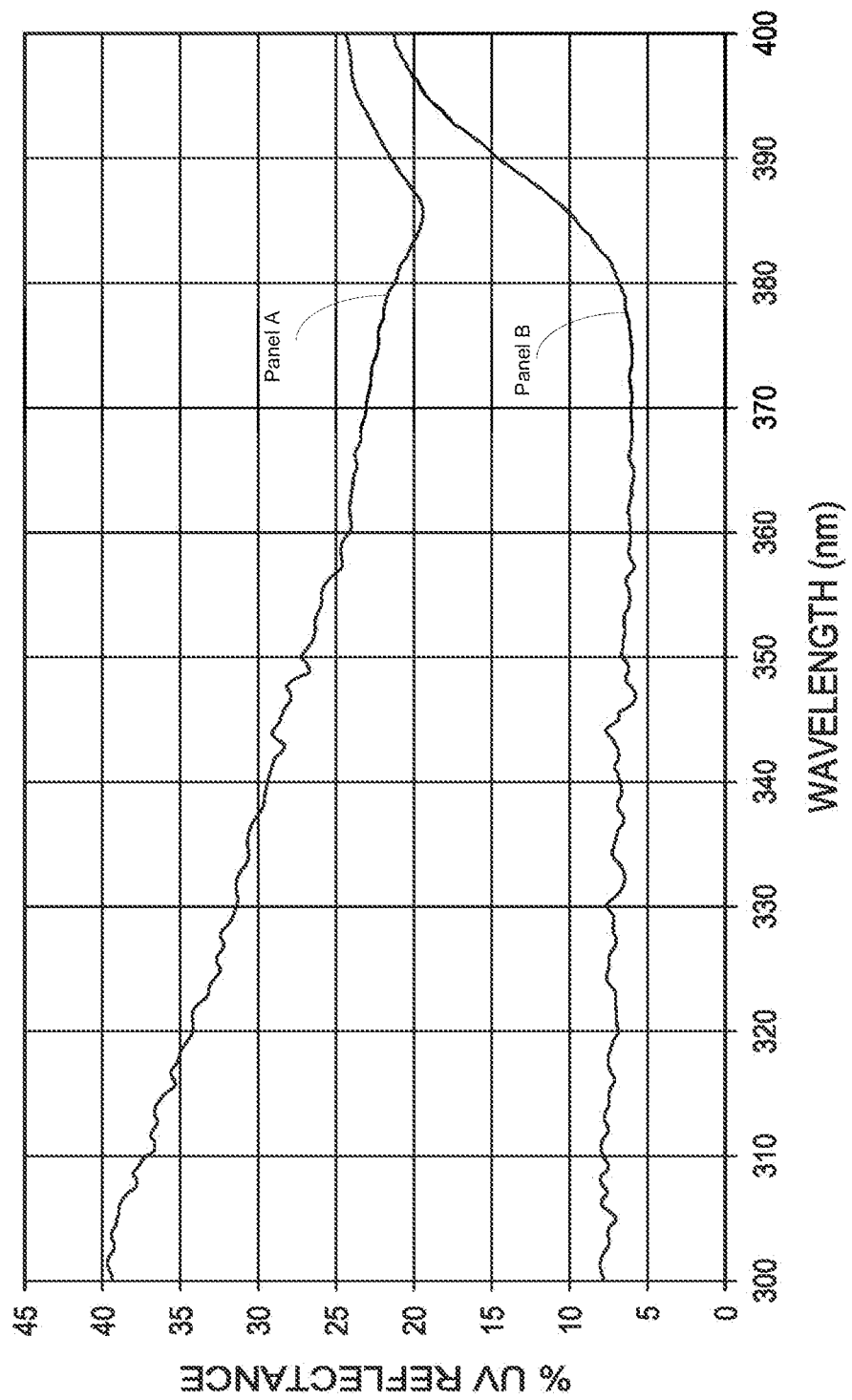
FIG. 6 is a plot of percent ultraviolet reflectance against wavelength for glass patterned according to the invention and a commercial glass.

FIG. 6 is a plot of ultraviolet reflectance against wavelength for a glass treated according to the present invention (panel A) and a commercial glass described as bird safe (panel B). The glass according to the invention (panel A) shows a minimum ultraviolet reflectance of 20% over the range of wavelengths between 300 and 400 nanometers.

Figure 8:
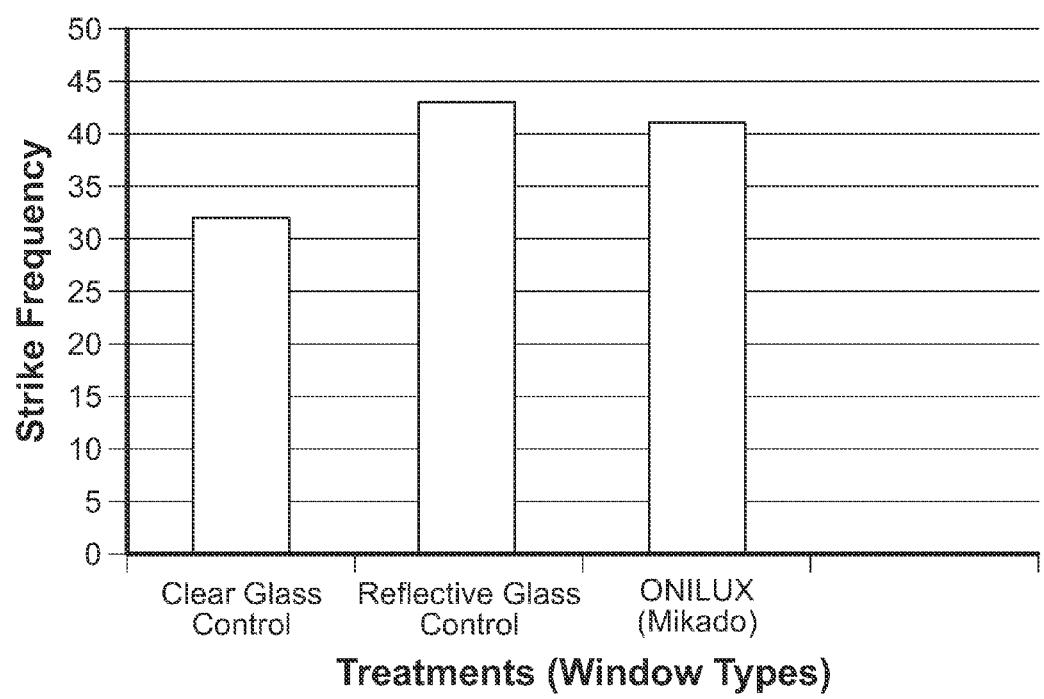
FIG. 8 is a bar graph of bird strike frequency for a clear and reflective glass and a commercial glass identified as bird safe.

Exposing a sample of panel B glass to the experimental set-up described above resulted in no fewer bird strikes than that for a sample of conventional untreated clear window glass, the results of the tests being shown in the plot of FIG. 8.

From the foregoing it has been observed that the most effective deterrent to bird collision with glass panels is achieved by a regular pattern of alternatively ultraviolet reflecting and ultraviolet absorbing materials where there is a minimum ultraviolet reflection of 20% over the range of 300 to 400 nanometers.

To ensure that any signal (UV or otherwise) will effectively prevent bird-window collisions the signal (pattern uniformly covering the pane) must be able to be perceived by birds (potential victims). This assurance (100% effective bird-window collision prevention) is only met when the preventive patters are applied to Surface 1 (the outside facing surface of a window in contact with the exterior environment). Application of preventive patterns to Surface 1 protects birds from clear or tinted sheet glass or plastic, and whether habitat and sky is visible to birds seeing through clear panes or as a reflection from Surface 1 of clear or tinted windows. The simplest physics of light teaches us that a perfectly clear window can perfectly reflect the facing habitat and sky (like a mirror) off Surface 1 if little or no light escapes from the interior of the part of the building the window covers; that is, when the light intensity (strength) is greater outside than inside the building. Under these reflection conditions, only patterns placed on Surface 1 will be visible to birds, and under these reflection conditions no patterns placed on any other Surface, 2 or otherwise (in multi-pane windows) will be visible to birds because the reflection off of Surface 1 hides (masks) the interior pattern attempting to prevent a bird-window collision. At window installation sites where habitat is visible behind clear panes such as glass-lined corridors, or where clear panes are placed one behind the other creating an illusion of an unobstructed passageway through rooms, preventive patterns applied to inner window Surfaces (Surfaces other than Surface 1) can be effective in preventing collisions if the patterns are visible to birds looking at the window from the outside. The reflective illusions of habitat and sky are far more abundant in human buildings than placements creating see-through passageway effects, and this fact makes it essential (important) that successful preventive bird-window collision patterns be applied to Surface 1.

Therefore, the most effective application of the present invention occurs when the patterning and ultraviolet reflective parameters are in the surface of the glass facing outwardly, i.e. Surface 1.

Having thus described my invention what is desired to be secured by Letters Patent of the United States is set forth in the appended claims.

What is claimed is:

1. A generally flat window pane having created on a surface of said pane a uniform pattern of elements, said elements having optical characteristics of ultraviolet reflection in a range of from 300 to less than 400 nanometers in wavelength separated by ultraviolet absorption in a range of from 300 to less than 400 nanometers in wavelength wherein said elements are dots having a minimum diameter of 0.317 centimeter (0.125 inch) spaced apart from each other a distance of from 0.317 centimeter (0.125 inch) to 10 centimeters (4 inches) and wherein there is a minimum of 20% ultraviolet reflectance in the element having optical characteristics of ultraviolet reflection over the range of 300 to less than 400 nanometers.

2. A generally flat window pane having created on a surface of said pane a uniform of elements, said elements having optical characteristics of ultraviolet reflection in a range of from 300 to less than 400 nanometers in wavelength separated by ultraviolet absorption in a range of from 300 to less than 400 nanometers in wavelength wherein said elements are horizontal lines having a minimum width of 0.317 centimeter (0.125 inch) spaced apart from each other a distance of from 0.317 centimeter to 5 centimeters (2 inches) and wherein there is a minimum of 20% ultraviolet reflectance in the element having optical characteristics of ultraviolet reflection over the range of 300 to less than 400 nanometers.

3. A generally flat window pane having created on a surface of said pane a uniform pattern of elements, said elements having optical characteristics of ultraviolet reflection in a range of from 300 to less than 400 nanometers in wavelength separated by ultraviolet absorption in a range of from 300 to less than 400 nanometers in wavelength, wherein said elements are vertical lines having a minimum width of 0.317 centimeter (0.125 inch) spaced apart from each other a distance of from 0.317 centimeter (0.125 inch) to 10 centimeters (4 inches) and wherein there is a minimum of 20% ultraviolet reflectance in the element having optical characteristics of ultraviolet refection over the range of 300 to less than 400 nanometers.

4. A window pane according to claim 1 fabricated from glass with the elements on the side of the glass outward in a normal window installation.

5. A window pane according to claim 1 fabricated from plastic with the elements on the side of the glass facing outward in a normal window installation.

6. A window pane according to claim 1 fabricated from plastic with the elements on the side of the glass facing window outward in a normal window installation.

7. A generally flat window pane being one of glass or plastic having created on a surface of said pane a pattern of vertical elements, said elements having a minimum thickness of 0.317 centimeter (0.125 inch) with said elements spaced apart from each other between 0.317 centimeter (0.125 inch) and 10 centimeters (4 inches) and said elements being ultraviolet reflecting between 400 to less than nanometers in wavelength separated by spaces ultraviolet absorbing between 400 to less than nanometers in wavelength and where there is a minimum of 20% ultraviolet reflectance in the element having optical characteristics of ultraviolet reflection over the range of 300 to less than 400 nanometers.

8. A window pane according to claim 7 fabricated from glass with the elements on the side of the glass facing outward in a normal window installation.

9. A window pane according to claim 7 fabricated from plastic with the elements on the side of the glass facing outward in a normal window installation.

10. A window pane according to claim 7 having optical characteristics being one of transparent or tinted with the patterning on the outside surface of the window pane.

11. A generally flat window pane having on a surface of said pane a pattern of horizontal elements, said elements having a minimum thickness of 0.317 centimeter (0.125 inch) with said elements spaced apart from each other between 0.317 centimeter (0.125 inch) and 5 centimeters (2 inches), and elements are ultraviolet reflecting between 300 to less than 400 nanometers in wavelength with spaces between said elements being ultraviolet absorbing between 300 to less than 400 nanometers in wavelength and where there is a minimum of 20% ultraviolet reflectance in the elements having optical characteristics of ultraviolet reflection over the range between 300 to less than 400 nanometers.

12. A window pane according to claim 11 fabricated from glass with the elements on the side of the glass facing outward in a normal window installation.

13. A window pane according to claim 11 fabricated from plastic with the elements on the side of the glass facing outward in a normal window installation.

14. A window pane according to claim 11 having optical characteristics being one of transparent or tinted with the patterning on the outside surface of the window pane.

15. A generally flat window pane having a surface of said pane a pattern in the form of a grid comprised of vertical and horizontal elements, said vertical elements being a minimum thickness of between 0.317 centimeter (0.125 inch) and vertical elements placed in generally parallel columns between 0.317 centimeter (0.125 inch) and 10 centimeters (4 inches) apart, said horizontal elements being a minimum thickness of between 0.317 centimeter (0.125 inch) and 5 centimeters (2 inches) apart wherein said vertical and horizontal elements form a grid pattern and where alternative vertical and horizontal elements are ultraviolet reflecting in the range of 300 to less than 400 nanometers wavelength and where there is a minimum of ultraviolet 20% reflectance in the elements having optical characteristics of ultraviolet reflection over the range of 300 to less than 400 nanometers.

16. A window pane according to claim 15 wherein said vertical and horizontal elements are 2.5 centimeters (1 inch) in width.

17. A window pane according to claim 15 wherein said vertical and horizontal elements are 0.317 centimeter (0.125 inch) in width.

18. A window pane according to claim 15 fabricated from glass with the elements on the side of the glass facing outward in a normal window installation.

19. A window pane according to claim 15 fabricated from plastic with the elements in the side of the plastic facing outward to a normal window installation.

20. A window pane according to claim 15 having optical characteristics being one of transparent or tinted with the patterning on the outside surface of the window pane.

* * * * *